United States Patent
Ashe

(10) Patent No.: US 10,632,449 B2
(45) Date of Patent: Apr. 28, 2020

(54) METHOD OF MIXING USING AN IMPROVED FLOW REACTOR

(71) Applicant: Ashe Morris Ltd., Cheshire (GB)

(72) Inventor: Robert Ashe, Cheshire (GB)

(73) Assignee: Ashe Morris Ltd., Cheshire (GB)

( * ) Notice: Subject to any disclaimer, the term of this patent is extended or adjusted under 35 U.S.C. 154(b) by 430 days.

(21) Appl. No.: 14/439,728

(22) PCT Filed: Oct. 30, 2013

(86) PCT No.: PCT/EP2013/072739
§ 371 (c)(1),
(2) Date: Apr. 30, 2015

(87) PCT Pub. No.: WO2014/068011
PCT Pub. Date: May 8, 2014

(65) Prior Publication Data
US 2015/0298095 A1 Oct. 22, 2015

(30) Foreign Application Priority Data
Oct. 30, 2012 (GB) .................................. 1219476.7

(51) Int. Cl.
| B01J 19/00 | (2006.01) |
|---|---|
| B01J 19/28 | (2006.01) |
| B01F 11/00 | (2006.01) |
| B01F 5/06 | (2006.01) |
| B01F 7/00 | (2006.01) |

(52) U.S. Cl.
CPC ............ *B01J 19/28* (2013.01); *B01F 5/0612* (2013.01); *B01F 5/0619* (2013.01); *B01F 7/001* (2013.01); *B01F 7/00116* (2013.01); *B01F 7/00141* (2013.01); *B01F 7/00291* (2013.01); *B01F 7/00458* (2013.01); *B01F 7/00633* (2013.01); *B01F 7/00641* (2013.01); *B01F 7/00916* (2013.01); *B01F 11/0002* (2013.01); *B01F 11/0077* (2013.01); *B01F 11/0088* (2013.01); *B01J 19/006* (2013.01); *B01J 19/0066* (2013.01); *B01F 2005/0625* (2013.01); *B01F 2005/0637* (2013.01); *B01F 2215/0422* (2013.01); *B01F 2215/0481* (2013.01); *B01J 2219/00763* (2013.01); *B01J 2219/1943* (2013.01)

(58) Field of Classification Search
CPC ...... B01J 19/28; B01J 19/006; B01J 19/0066; B01J 2219/00763; B01J 2219/1943; B01F 5/0619; B01F 5/0612; B01F 7/00116; B01F 7/00141; B01F 7/00291; B01F 7/00458; B01F 7/00633; B01F 7/00641; B01F 7/00916; B01F 7/001; B01F 11/0088; B01F 11/0002; B01F 11/0077; B01F 2005/0625; B01F 2005/0637; B01F 2215/0422; B01F 2215/0481
USPC .................................. 423/659; 366/237–239
See application file for complete search history.

(56) References Cited

U.S. PATENT DOCUMENTS

| 3,495,951 A | * | 2/1970 | Tanaka et al. ............ B01F 7/08 165/86 |
|---|---|---|---|
| 4,974,781 A | | 12/1990 | Placzek |
| 8,293,850 B2 | * | 10/2012 | Cavaglia .................. B01J 19/28 525/418 |
| 2009/0180933 A1 | | 7/2009 | Kauling |

FOREIGN PATENT DOCUMENTS

| EP | 1146064 A2 | 10/2001 |
|---|---|---|
| GB | 1447687 | 8/1976 |
| GB | 2123308 A | 2/1984 |
| GB | 2477422 A | 3/2011 |
| JP | 10/213379 | 11/1998 |
| JP | 11128995 A | 5/1999 |
| JP | 2000/301111 A | 10/2000 |
| JP | 2004358419 A | 12/2004 |
| JP | 2005305405 A | 11/2005 |
| JP | 57/21023 | 5/2015 |
| WO | 2004/018541 A1 | 3/2004 |
| WO | 2007/131728 A1 | 11/2007 |
| WO | 2008/102249 A1 | 8/2008 |
| WO | 2011/117625 A1 | 9/2011 |
| WO | 2011/124365 A1 | 10/2011 |

OTHER PUBLICATIONS

Machine translation of WO2007/131728, Nov. 2007.*
Translation of Japan 2000-301111, Oct. 2000. (Year: 2000).*
Translation of Japan 10-213379, Aug. 1998. (Year: 1998).*
PCT International Search Report & Written Opinion dated Jun. 24, 2014; Application No. PCT/EP2013/072739.
UK Search Report dated Feb. 27, 2013; Application No. GB1219476.7.

* cited by examiner

*Primary Examiner* — Steven J Bos
(74) *Attorney, Agent, or Firm* — The Dobrusin Law Firm, P.C.

(57) ABSTRACT

A method of mixing using a tubular reactor wherein process material continuously passes through the tubular reactor which is operating at predetermined reaction conditions. The tubular reactor is rotated through reciprocating arcs about the longitudinal axis of the tube as the process material passes therethrough. Static and/or dynamic mixers or agitators may be provided within the tubular reactor.

13 Claims, 3 Drawing Sheets

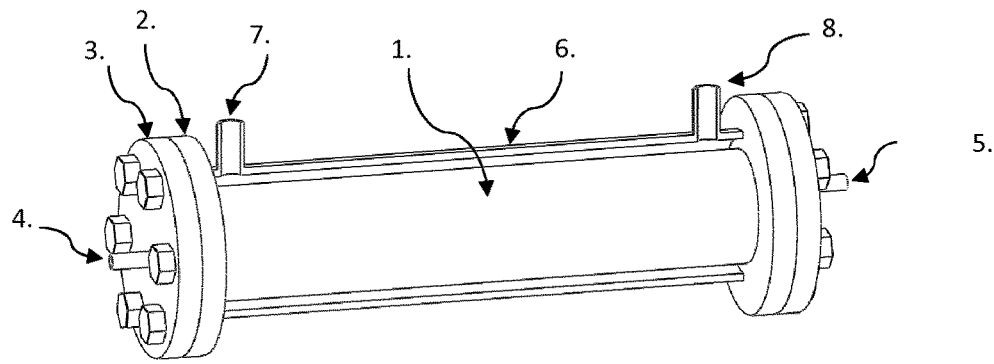
Figure 1 - Typical flow reactor
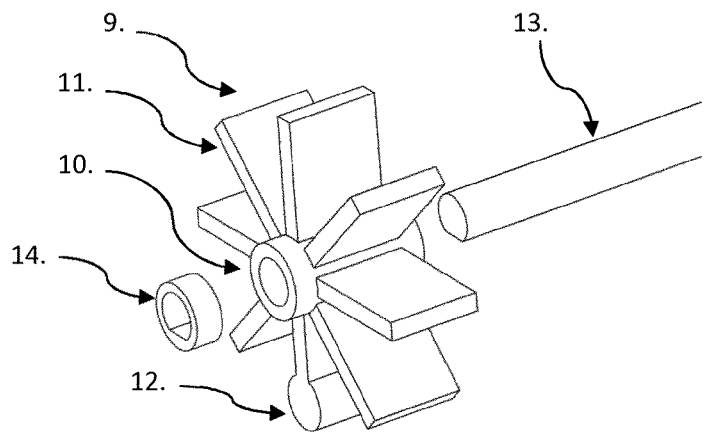
Figure 2 – Dynamic mixer and shaft detail
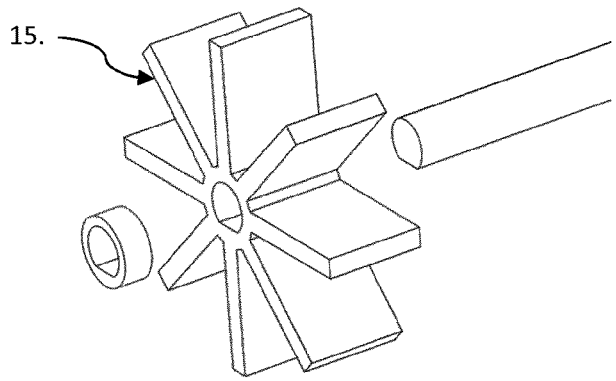
Figure 3 – Static mixer and shaft detail

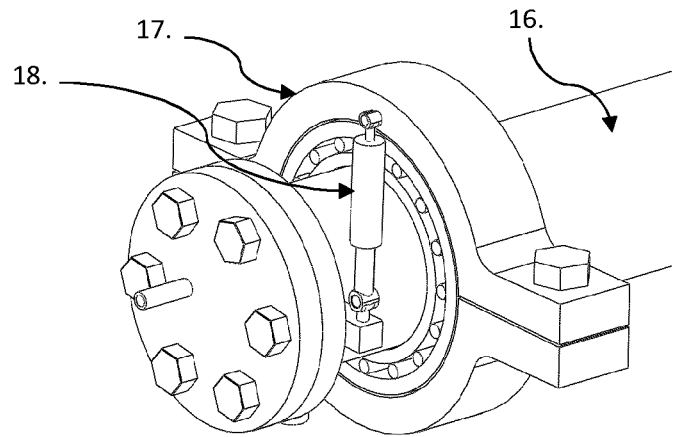
Figure 4 – Reactor mounting and drive unit
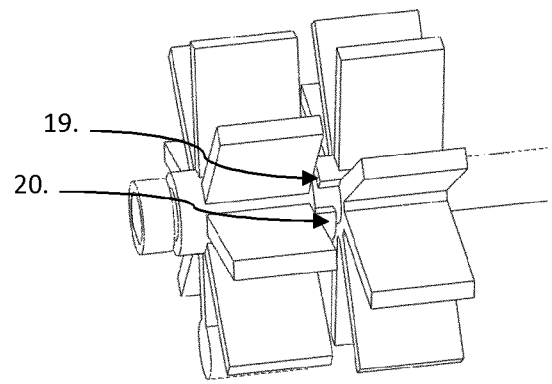
Figure 5 – Agitator stops.
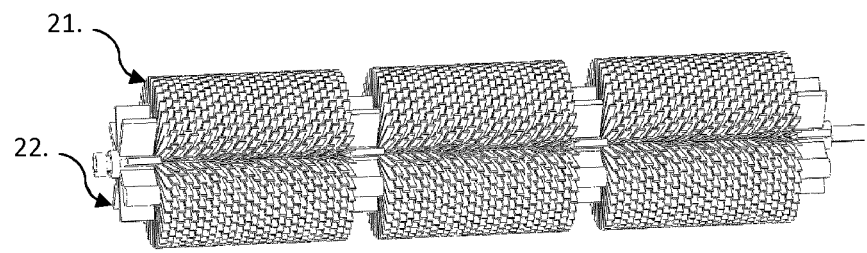
Figure 6 – Complex mixers with simple mixers

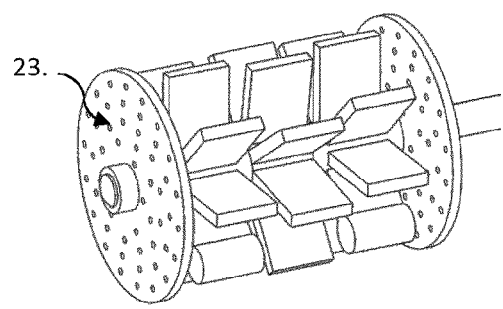
Figure 7 – Baffle plates
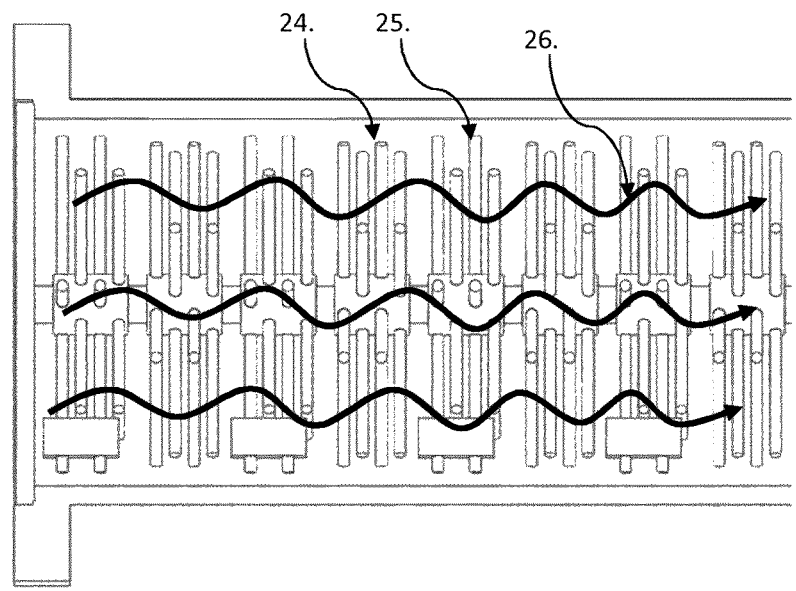
Figure 8 – Flow path across agitators

METHOD OF MIXING USING AN IMPROVED FLOW REACTOR

The present invention relates to a method and apparatus for mixing fluids in tubes and is particularly useful for applications where good plug flow or good mixing are required and especially when both are required. The method and apparatus may be used for conveying non homogenous fluid mixtures which require constant mixing (such as slurries) but the preferred use is for applications where both good mixing and good plug flow are required. The process and apparatus of the invention is useful in a wide range of process involving physical, biological and/or chemical change. Blending, physical reactions such as crystallisation, gas phase, slurry phase, mixed phase reactions and reactions in the liquid phase. The range of applications include but is not limited to manufacturing processes for foods, pharmaceuticals, bio processes, fine chemicals, the entire range of chemical, petrochemical and refining processes, polymerisation and minerals processing.

A flow reactor is primarily a steady state system where process material undergoes physical, chemical or biological change as it passes through the reactor continuously. Only a proportion of the process material for a given process cycle is held in the reactor at any time (unlike a batch reactor where all the process material for a process cycle is present at some point). The advantages of flow reactors over batch reactors relate to reduced physical size which contributes to better mixing of the process fluid and improved heat transfer between the process fluid and the body of the reactor (by virtue of reduced size). The commercial benefits of flow reactors over batch reactors for industrial processes are dependent on application but variously include reduced capital cost, higher product yield, improved purity of the product, reduced solvent use, improved safety and lower energy requirements and thus reduced cost. These advantages are well documented in literature.

The difference between a conveyor for moving process materials and a flow reactor is that in a conveyor, material is transferred from one point to another whereas in a flow reactor the properties of the process material undergo a physical, biological or chemical change as it is conveyed through the reactor. The nature of the process material is therefore changing as the reaction takes place along the reactor. Plug flow implies that the process material travels through and leaves the reactor in the same time order as it enters. Plug flow is therefore important for controlling reaction time and optimising separation of unreacted and reacted material. Failure to achieve good plug flow can severely impair the reactor performance since, without this the reaction time cannot be controlled and back mixing of the process material can result in unwanted reactions and reduced reaction rate (due to the dilution effects in the case of $n^{th}$ order reactions). Good mixing and more preferably good radial mixing is also required to ensure efficient blending, homogeneity of the process material within the reactor and good heat transfer.

The present invention provides a tubular reactor provided with means whereby the tube may be rotated through reciprocating arcs about the longitudinal axis of the tube.

In a further embodiment the invention provides a reaction wherein process material continuously passes through a tubular reactor operating at predetermined reaction conditions wherein the tubular reactor is rotated through reciprocating arcs about the longitudinal axis of the tube as the process material passes therethrough.

The following terms have the following meaning.

Flow reactor—This is a channel or series of stages through which process material flows continuously and a physical, chemical or biological change takes place within the process material as the process material passes through it.

Process material is the material which flows through the reactor. This may include both reacting and non reacting materials (such as diluents or catalysts) The composition of the process material will change along the reactor as the materials change or react to form the desired reaction product. The process material may be liquid, gas, vapour, a critical fluid or any other material capable of flowing. It may also be a mixture of these and the process material may also contain solid particles.

Tubular flow reactor—A flow reactor where the overall length of the channel in the direction of flow is 3 times greater and more preferably 5 times greater and more preferably still 10 times greater than the diameter of the channel. A tubular flow reactor may be made up of a single tube or multiple tubes.

Plug flow—is a well known term and is an orderly flow pattern through the reactor where minimum back mixing occurs and substantially all fluid elements have substantially the same residence time in the reactor. Ideal (100%) plug flow cannot be achieved in practice due to the influences of diffusion and fluid mixing. Plug flow in this document means residence time control comparable to at least 5 tanks in series and more preferably 10 tanks in series per reactor tube (a reactor may use multiple tubes) or greater. In many cases, the required plug flow quality will vary in response to changes in the reaction rate as occurs in $n^{th}$ order reactions. In these applications, different diameter tubes along the channel length can be used to take account of the different plug flow requirements. This means using small diameter tubes (which give higher velocity and therefore better plug flow) where the quality of plug flow needs to be higher.

Mixing—All fluids mix to some extent by molecular diffusion. Mixing as used herein refers to differential movement of bulk fluid elements so as to achieve desired conditions of blend uniformity, shear, heat transfer and plug flow. The mixing conditions may be turbulent or laminar.

Axial mixing—This is mixing in the axial plane in the direction of the net flow direction of the process material typically along the tube.

Radial mixing—This is mixing in the radial plane which is at 90 degrees to the net flow direction of the process material typically across the tube. The preferred mixing action is to have a high degree of radial mixing with a low degree of axial mixing.

Static mixer—This is a mixing element which remains stationary relative to the reactor body.

Dynamic mixer—This is a mixing element which moves in relation to the reactor body.

Baffle—This is a plate across the diameter of the flow channel with apertures to allow fluid to pass along the tube in the axial direction.

The process material may have a high solids concentration but the preferred concentration of solids in the process material is less than 50% by volume and more preferably less than 25% by volume. The changes due to reaction of the process material include but are not limited to precipitation, crystallisation, chemical reaction, biological reaction, oligomerisation, polymerisation and extraction.

Mixing can be characterised in many ways but in this document, mixing implies adequate mixing. For homogenous fluids mixing refers to blending times of less than 10 seconds and more preferably less than 5 seconds and more preferably still less than 1 second. In some applications such as very slow reactions, longer blending times may also be acceptable. For non-homogenous materials, adequate mixing should be comparable to or better than a 1 liter stirred vessel with a pitched turbine blade rotating at 100 rpm and more preferably at 200 rpm and more preferably still at 400 rpm. In some applications mixing may not be comparable to these.

The reactor according to need may also have a system for adding or removing heat such as a temperature control jacket. Where the reactor is provided with an agitator shaft the shaft may contain a cooling system. The static and dynamic mixers may also contain a cooling system. A preferred temperature control system comprises a temperature sensor, a controller and a control element (such as a valve) for altering the temperature or flow of the heat transfer fluid so as to control the temperature of process material. In the case of electrical heating or cooling, the control element will vary the applied electrical power. The temperature sensor may be located in the heat transfer fluid stream or more preferably in the stream of process material. Multiple temperature control systems may also be used with multiple heating or cooling stages along the tube or in separate but connected tubes within the same system so as to address different temperature control requirements at different stages of the reaction.

The flow reactor may also have in-line analytical devices such as optical analysers, pH sensors or calorimetry so as to monitor and/or control the operation of the reactor. The analytical devices may be part of a control system comprising an analytical sensor, a controller and a control element which controls one or more variables. The preferred location for a single analyser is at the point where process material discharges from the reactor although other positions may be used. The controlled variables may be the rate of flow of one or more feed materials, the system pressure, the system temperature or any other parameter which affects reactor performance. More complex control systems can also be used with multiple analysers controlling 1 or more parts of the reactor and these may be located in different positions within the reactor.

The flow reactor may be provided with one or more internal baffles. The function of the baffle is to reduce back mixing (and hence improve plug flow) but may also be used to support an agitator shaft thus preventing excessive bending in said shaft.

The invention described here provides an effective and economic solution to four key requirements for flow reactors.

Volumetric capacity—Sufficient volumetric capacity is required to ensure that a reaction goes to completion for a given throughput. By virtue of generating efficient mixing which is not dependent on fluid velocity through the reactor (as is the case with conventional static mixer flow reactors), this invention provides volumetric capacity at a lower cost per unit volume than long thin tubes and with a lower pressure drop (since short large diameter tubes can be used without sacrificing mixing performance).

Plug flow—Establishment of plug flow provides the means for controlling reaction time and optimising separation of reacted and unreacted process material. For any process, a flow reactor will be smaller if good plug flow is employed since reacted material will be discharged in a timely fashion and not retained. For many processes such as $n^{th}$ order, competitive or consecutive reactions, good plug flow is required for maximising yield per unit volume, selectivity and purity. This invention provides a method for generating a high ratio of radial to axial mixing which is desirable for good plug flow. This invention provides the means for achieving plug flow at lower velocities and pressure drops than would be required in a simple tube or static mixer.

Mixing—The benefits of good mixing include; fast blending times, good heat transfer coefficients, good mass transfer between non-homogenous fluids, good slurry transfer and promotion of good plug flow (by the elimination of poorly mixed zones of fluid travelling at different axial velocities). These requirements will vary according to process application. This invention provides for efficient mixing over a wide range of applications and it does so irrespective of fluid velocity through the reactor.

Heat transfer—Effective heat transfer is required to add or remove heat so as to maintain the process material at the desired temperature. This invention provides a means of fitting an external heating/cooling jacket and internal cooling tubes so as to control the process temperature. This design is suitable for a wide range of tube diameters and by selecting different tube diameters, different ratios of heat transfer area to working volume can be achieved.

Temperature control—Temperature control means the application of heating or cooling so as to change or maintain the temperature of the process material at the desired value. The preferred meaning of temperature control as applicable to this invention is reaction temperature control. This means that the process temperature is maintained or changed to the desired value where the reaction is exothermic or endothermic.

Two broad classes of flow reactor are in common use. Static flow reactors rely on fluid movement through the reactor to generate mixing (by turbulent flow or splitting/bending/folding using baffles or static mixing elements). Conventional dynamic flow reactors use mixer blades mounted on rotating shafts. Such systems are expensive to build as they require mechanical seals or magnetic couplings. They also suffer from practical problems of shaft flexing in long tubes. In practice such systems are often built as stirred tanks in series. This adds to cost and complexity since many stages are required to achieve performance comparable to good plug flow. Patents WO 2008/068019 and WO 2011/124365 describe a method of dynamic mixing in flow reactors where the body of the reactor is subject to shaking which generates movement of internal agitators of a different density to the process fluid. The internal agitators are loose elements or they may be tethered to the vessel. When a tube filled with liquid is moved transversely (as described in the prior art), the position of the fluid in relation to the tube remains stationary. Under these conditions, mixing will only be generated if materials of more than one density are present.

According to the present invention the flow reactor is rotated through in reversing arcs around the long axis of the tube. Under these conditions, the inertia of the fluid will resist rotation thereby creating differential movement between the fluid and the inner surface of the reactor body and any fixed elements within it. Unlike the prior art previously described, this technique generates differential movement of the fluid (and therefore mixing) even when the reactor contents are of uniform density. An additional optional feature of this invention is that rotating agitators (dynamic agitators) can also be used mounted on one or more shafts within the fluid reactor. These also rely on the rotating motion of the reactor body to generate independent movement thereby increasing the mixing.

The invention is illustrated but in no way limited to the accompanying drawings in which a tubular reactor provided with means whereby the tube may be rotated through reciprocating arcs about the longitudinal axis of the tube to provide radial mixing combined with plug flow to enable a reaction wherein process material continuously passes through the tubular reactor operating at predetermined reaction conditions.

Static and/or dynamic mixers may be provided within the tubular reactor.

BRIEF DESCRIPTION OF THE DRAWINGS

FIG. 1 shows a typical flow reactor.
FIG. 2 shows a dynamic mixer and shaft detail.
FIG. 3 shows a static mixer and shaft detail.
FIG. 4 shows a reactor mounting and drive unit.
FIG. 5 shows agitator stops.
FIG. 6 shows complex mixers with combined simple mixers.
FIG. 7 shows the provision of baffle plates within the reactor.
FIG. 8 shows the flow path of the process material across the agitators.

DETAILED DESCRIPTION

A typical flow reactor is shown in FIG. 1 and consists of a channel (1) which will normally be a circular tube with a backing flange at each end (2). Sealing flanges (3) are bolted to the backing flanges to form a sealed system. The tube will be fabricated in a material to provide adequate mechanical strength to resist distortion or damage when operating under ambient pressure, elevated pressure or vacuum. The tube may be fabricated in a variety of metals such as stainless steel, hastelloy, carbon steel etc. Alternatively it may be fabricated in glass, ceramic material or even plastic. Where a combination of high mechanical strength and good corrosion resistance is required, the reactor body may be fabricated in one material and coated or lined with a different material. A feed pipe (4) is shown on one end flange and a discharge pipe (5) is shown on the opposite flange. Multiple feed and discharge pipes may be used and some of these may be located at intermediate points along the tube. A cooling jacket is shown (6) which is used to add or remove heat. The heat transfer feed pipe (7) is shown at one end of the jacket and the heat fluid discharge pipe is shown (8) at the other end of the jacket. The temperature control system has been described previously. On some systems, other forms of heating or cooling may be applied such as electrical heating elements or Peltier elements. The description above is for illustrative purposes and many variations and alternatives to this arrangement are possible.

FIG. 2 shows an exploded detail of a dynamic agitator, shaft and shaft mounting collar. The agitator (9) has a central boss (10) with a circular hole at the centre. Multiple mixing blades (11) are mounted on the boss. The blades may be simple paddles as shown, they also be pitched turbines, multiple thin blades, wires, mesh or any other shape. One (or more) blade (12) has a greater mass. In the Figure, the increased mass is achieved by making the blade physically larger. Alternatively or additionally, the blade may be of the same size as the other blades but fabricated with a more dense material. The agitator is mounted on a shaft (13) with a loose fit. The agitator shaft and the internal hole of the boss should have smooth low friction surfaces. 0 rings or a soft bush may be used to protect the moving surfaces where the process material contains abrasive solids. The agitator shaft (13) has a flat face on the circumference to prevent the shaft from rotating on the shaft support collar (14). Other shapes of shaft or alternative methods such as locking nuts may be used to keep the shaft in a fixed position. Shaft support collars are mounted at each end of the reactor body to hold the agitator shaft. The shaft support collars may form part of the end flanges of the reactor or be mounted on a separate frame or plate at the end of the tube. The preferred position of the agitator shaft within the reactor is along the central axis. For some applications however, the agitator shaft may not be centrally mounted and in other cases two or more agitator shafts may be used.

FIG. 3 shows an exploded detail of a static agitator, shaft and shaft mounting. The agitator (15) is fixed to the shaft and in this example uses a flat spot on the radius on the shaft to prevent rotation on the shaft. Other methods for fixing the agitator on the shaft may be used.

The static and dynamic agitators may be rigid or flexible. Flexible agitators will give greater tip travel when the direction of the agitator shaft rotation changes. This gives improved mixing performance and these agitators may be weighted at the tips to increase the bending and mixing effect.

FIG. 4 shows the reactor body. This is shown as a tube (16) mounted on a bearing (17) which allows the body of the reactor to rotate. The bearing which allows the reactor to rotate is shown around the reactor body but may alternatively be mounted in a rotating cradle or shafts projecting from the ends or the body of the reactor. Alternatively (to bearings), rubber bushes, springs, low friction sleeves or other flexible devices may be used to allow the reactor body to rotate. The preferred axis of rotation is the centre axis of the reactor tube. Alternatively however the axis of rotation may be off centre such as on a swing arm. Also shown is a drive mechanism (18) which causes the reactor to rotate in reciprocating arcs on the mounting. The drive mechanism may also be assisted by recoil springs, pneumatic pistons or other devices (one element mounted to a fixed object and the other on the rotating reactor) to conserve energy and help reverse the arc of rotation at the end of its travel. The drive mechanism shown is a pneumatic or hydraulic piston. Alternative drive mechanisms may also be used such as, gears, cogs, motors, electromagnetic devices etc. The drive mechanism rotates the reactor through reciprocating arcs (clockwise followed by anti-clockwise or vice versa). The maximum degree of rotation is 360°. The degree of rotation will vary according to application however the preferred degree of rotation is between 1° and 90°. The degree of rotation of the reactor body operating under turbulent conditions should be large enough to generate turbulence throughout the reactor volume and this will depend on multiple factors. The degree of rotation of the reactor body under laminar conditions should be such that the maximum volume of the tube space is swept by agitator blades. The preferred minimum number of blades in such cases is (360)/n where n is the number of mixing blades used. The value of 360 can be reduced to account for the thickness of the blades. The more preferred rotation arc is less than 45°. The speed of rotation will vary according to application and degree of rotation and will vary from less than 1 rotation a minute to more than 10 cycles per second.

Mixing with static mixers—Although a simple tube can be used, static mixing elements as shown in FIG. 3 are preferred as they serve to generate mixing across the diameter of the tube. As the body of the reactor is rotated in reversing arcs, the combined effect of differential movement between the fixed elements of the reactor and the fluid will generate mixing.

Mixing with dynamic mixers—A further preferred solution is to employ dynamic mixing elements as shown in FIG. 2. These mixing elements as shown are unbalanced and free to rotate on the shaft. As the body of the reactor is rotated, these will move at a different speed and phase to the fluid and fixed agitators. The movement of the dynamic mixers (in terms of speed and radius of arc) will vary according to the properties of the process material, the design of the rotating mixers and the speed and the angle of rotation of the reactor body. Stops can be used between the agitator and a fixed point on the agitator shaft as shown in FIG. 5. The fixed stop (19) is shown on the static agitator. The fixed stop may also be located on the shaft or other part of the main reactor body. The moving stop (20) is shown on the dynamic agitator. By using stops in this manner, the degree of travel of the agitator can be limited and the acceleration can also be increased.

The rotation of the dynamic mixers can be through small arcs in which case a larger number of mixer blades are desirable to ensure that the volume of the reactor space is fully swept. Where turbulent conditions can be achieved, a reduced swept volume can be tolerated providing the turbulence extends to the full working volume. In some applications, the dynamic mixers will move through an arc and in other cases, the dynamic mixers will rotate continuously in one direction. This can be achieved by tuning the shaking conditions to generate continuous rotation. Continuous rotation can also be promoted by designing the blade shape such that the drag resistance is greater in one direction of rotation than the other.

An alternative arrangement to the one described above is to have the dynamic mixers (9) fixed to the shaft and have a freely rotating shaft. In this case the shaft support collar is circular on the inner radius allowing free rotation of the shaft.

In other cases and particularly for viscous fluids a ratchet mechanism or similar can be employed which only allows the dynamic mixer to rotate in one direction. The ratchet mechanism (or stops) is formed between locking points (fixed relative to the reactor body) and the rotating mixer respectively. In some cases, the dynamic agitators can be arranged so that different agitators (normally adjacent ones) move in contra rotating directions. The continuously rotating agitator in this case can be balanced or unbalanced.

Mixing with dynamic and static mixers—For high mixing performance, a more preferred option is to use a combination of static and dynamic mixers. The functional design of these will vary according to the application as described in the examples below.

For some mixing applications, a high degree of mixing is required. This will typically apply to processes where fast blending times are required such as with competitive reactions. It will also apply where there is more than one phase (immiscible liquids, gas/liquid mixtures and solid/liquid mixtures). By having adjacent agitators travelling at different speeds and/or in different directions, better mixing is achieved.

Where viscous fluids are being handled or good plug flow is required, the use of complex mixers with high surface areas and good voidage are preferred. This should be a complex structure such that the fluid can flow through the mixer whilst being split at multiple points. The radial mixing distances with both the complex mixers will be small for some applications this can lead to compositional and temperature gradients across the diameter. This can be addressed by using different kinds of mixers. FIG. 6 shows a complex mixer (21). Between the complex mixers are simple mixers (22). The simple mixer generates mixing over a larger diameter of the tube and therefore redistributes process material across the diameter. The simple mixer will generate a higher degree of back mixing and therefore it is desirable that the axial length of tube occupied by the simple mixer elements (21) is as short as possible. Alternatively the position of the apertures in the baffle plates can be used to redistribute the flow between the mixers. For this, the apertures in the baffle may be concentrated at the perimeter of the baffle, at the inner radius of the baffle working surface or at an intermediate point. The preferred location is at the mid-point between at the perimeter of the baffle, at the inner radius of the baffle working surface or slightly offset from the mid-point.

When handling multiphase mixtures of different densities in horizontal or near horizontal tubes, there is a tendency for the denser phase material to collect in the lower half of the tube. In such applications the reactor as described here can fulfil two functions. The dynamic mixer promotes good mixing but can also redistribute the light and dense phases in the vertical plane by swinging in larger arc (than the reactor is rotating) or by continuously rotating. This will tend to lift the more dense material and push lighter material down. By doing so, this increases interphase contact to give a faster reaction.

The diameter of the mixer can vary from 10% of the reactor tube diameter to the full diameter subject to application. The preferred diameters are between 40% and 70% of the tube diameter for simple blades such as those shown (15) in FIG. 3. These are preferably for lower viscosity fluids where the impeller can generate dynamic mixing or for redistribution in the radial plane as shown (22) in FIG. 6. Complex mixers shown (21) in FIG. 6 or disc blades are preferably the full diameter of the reactor tube subject to enough clearance to rotate.

The agitator shaft should be strong enough to carry the load of the agitators and ideally fabricated in a low friction material when dynamic agitators are used. The inner surface of the dynamic agitators should also be a low friction material. They may also be in a softer material than the shaft (or vice versa) so that wear parts can be replaced.

A range of shapes and sizes of mixers can be employed including cylindrical mixers either balanced or unbalanced. Cylindrical mixers are used where high shear or high heat transfer area per unit volume is required. By using a cylinder, the inner tube volume can be reduced to give high surface to volume ratios and where necessary high shear by having narrow spaces between the agitator and the inner walls of the tube.

Baffles (23) in FIG. 7 are used to prevent back mixing. These are perforated plates mounted on the mixer shaft and restrict the flow area so that process material travels in one direction only across the baffle plates. In addition or as an alternative to holes in the baffle, cut outs can be used at the perimeter at the top or bottom so as to prevent light or heavy materials respectively from accumulating between the baffles. The baffles may be of different diameters but typically are the maximum diameter that allows them to slide into the tube. Baffles can also be used to support the shaft and prevent excessive bending where the bending force due to the agitators is high. This permits the use of thinner agitator shafts than would be required without support baffles. Different arrangements of baffles and mixers can be used. FIG. 7 shows two baffles separated by three mixers, two dynamic and one static respectively. Where simple mixers are used it is preferred that 5 or more baffles are used per reactor tube (a reactor system may have multiple tubes) and more preferably 10 or more baffles per tube.

The inlet and outlet connections for feeding and discharging the process material should be mounted on the tube at the maximum distance apart for orderly flow and so that full use of the length of the reactor tube is achieved. The connections are fitted to the end plate. Where there is a need to access the end plates without disconnecting the feed and discharge pipes, the feed and discharge connections are fitted to the wall of the tube at a minimum distance from the respective end plates. For processes where there is a need to make multiple additions (such as gas/liquid reactions or reactions which exceed the cooling capacity of the reactor) multiple addition points may be fitted along the length of the tube.

The reactor tubes may be mounted horizontally, vertically or at a slope. A slope is preferable where free draining is required or to assist the movement of light or heavy materials along the reactor tube where there are two phases (slope upwards to handle floating materials and downwards for sinking materials). Horizontal or near horizontal tubes are preferable where the process material has two or more phases of different densities. The reactor tubes may be split in the axial plane but the preferred arrangement is a solid tube.

The length of the reactor tube will vary according to needs and can be from 50 millimeters or less to 10 meters or more but more preferably will vary from 0.5 meters to 3 meters. Short tubes provide better access for inserting and removing the mixer assembly. Where the tube lengths are in excess of 3 meters and more preferably in excess of 2 meters, it is preferable to use multiple tubes coupled together preferably by flexible connections.

The diameter of the reactor tube will vary according to application and can vary from less than 1 millimeter to more than 2 meters. For fast reactions and exothermic reactions (typically reaction times of less than 1 minute), tubes in range of 5 millimeters to 50 millimeters diameter are preferred. The reactor cost per unit volume is lower with large diameter tubes and therefore, where possible, the maximum diameter tube is desirable. Where reaction times are greater than 1 minute and not constrained by heat transfer needs, large diameter tubes from 50 millimeters to 500 millimeters are preferable. Given that reaction rates vary, the preferred solution for many applications will be to use a number of tubes connected in series and that the diameters of the respective tubes may be the same or different to suit the changing reaction rate.

The reactor can be operated over a wide range of pressures and temperatures subject to selection of the right materials of construction and material thicknesses. Containment of process material is aided by absence of moving joints such as mechanical seals.

The system may be used for unidirectional flow or counter current flow. In counter current flow, two fluids are fed at different ends of the reactor tube and each discharges at the opposite respective ends. This method can be used for some types of reaction and also extraction. For such processes to work the counter current fluids must be substantially insoluble in each other and of different densities. Counter current systems may have unmixed separation zones at each end of the reactor as well as intermediate separation zones at stages along the reactor length.

A flow reactor requires feed and discharge pipes to transfer fluids from fixed objects such as tanks and pumps to the rotating reactor body. These pipes must have sufficient flexibility to take the rotational movement of the reactor body. If the movement is small, rigid connection pipes can be used with sufficient length and bends to absorb stress of the movement. Where the extent of movement is large rigid pipes with long radius bends can be used or flexible tubes such as plastic tubes or corrugated metal tubes.

Good plug flow is one necessary parameter for controlling residence time of process material in the reactor. The other parameter is delivering process material at a controlled feed rate. This can be achieved with metering pumps, non-metering pumps whose flow has been calibrated, gravimetric feeding at constant and calibrated heads. The feed rate can also be controlled using a flow control systems comprising of a flow measuring device, a controller and a control element such as a flow control valve to regulate the flow.

FIG. 8 shows a flow path of process material through the reactor. The agitators used in FIG. 8 are spokes on a central hub although other agitator types may be used. The static agitators (24) and the dynamic agitators (25) permit axial flow past the agitators at multiple points (26) across the diameter of the reactor and preferably greater than 20% of the reactor diameter and more preferably greater than 50% of the diameter. This means that the nominal length of the flow path is equal to the length of the reactor tube (discounting the effects of radial mixing). The nominal flow path may be longer however where baffles (as described previously) are used to restrict flow past the baffles to one or more radiuses. This invention is preferable for process materials of more than one density are present. A co-filed patent filed on the same day which limits the axial flow past the agitators to small apertures at one radius of the reactor tube.

The features of this invention are as follows:
The body of the reactor is rotated through reciprocating arcs to generate mixing in the reactor. This eliminates the need for agitator shafts connected to an external drive unit by mechanical seals or magnetic couplings.
By limiting the rotation to arcs of 360° or less, the reactor body can be connected to fixed objects by flexible fluid transfer pipes, electrical cables and instrument cables. By repeatedly reversing the direction of rotation, the agitators move at different velocities and at some parts of the cycle different directions to the fluid thereby generating improved mixing. The use of reversing arcs also reduces the need for high rotation speeds thus reducing wear on the shaft or dynamic agitators.
The reactor body can be fabricated as a simple tube with no internal features (such as baffles). The agitator assemblies may be pushed or pulled into the tube. This design reduces fabrication cost and makes cleaning and maintenance simpler.
A thinner agitator shaft can be used as it is fixed in relation to the body of the reactor and can be supported at intermediate points.

The use of a combination of static and dynamic mixers gives enhanced mixing.

The use of an agitator shaft which has a flat face (13) shown in FIG. 2 (or similar), the baffles and agitators can be pushed into place and depending on their internal shape permitted to rotate or stay fixed on the shaft.

This patent differs from prior art described in Patents WO 2008/068019 and WO 2011/124365 in that the agitators of this system are part of or rotate around a fixed axis. It embodies static mixing principles with the static mixers, dynamic mixing with the dynamic mixers or a combination of the two. Unlike the prior art given above, this prevents impact between the agitators and the reactor body and allows the agitator position to be fixed such that the optimum position in the diameter of the reactor tube. These features can be used in systems with tube diameters of less than 50 mm but are more desirable in larger system with tube diameters of greater than 50 mm.

The commercial applications of this invention are varied. The value of this invention relates to both performance and fabrication cost:

For processes handling non-homogenous materials, this reactor provides high mass transfer rates by virtue of efficient mixing and horizontal (or near horizontal mounting). The significance of horizontal mounting is that the distance by which heavy phase materials have to be lifted (and vice versa for lighter phases) is smaller than in vertically mounted tubes. This design also suits slurry handling where large diameter tubes and good mixing are desirable.

The required volumetric capacity of a flow reactor is determined as follows:

Volumetric capacity (liters)=volumetric flow (liters/second)×reaction time (seconds)

Where high volumetric capacity is required, it is preferable to use short large diameter tubes for reasons of cost and minimum pressure drop. This invention provides a dynamically mixed flow reactor where efficient mixing can be achieved independently of fluid velocity through the tube. This allows large diameter tubes to be used at low fluid velocities without compromising mixing efficiency. For this reason reactors of this type can be used for a wide range of applications where high volumetric capacity is required. Whilst reactors of this type can operate effectively with volumetric capacities of less than 100 milliliters, they offer economic solutions for systems up to 100 liters per tube or more.

A second embodiment of this invention is a rotating shaft with rotating and fixed mixer elements as described for FIGS. 2 and 3 respectively where the shaft rotates and is driven by an external drive unit by mechanical seals or magnetic couplings. As with the description above, the rotation is reversed. With an external drive unit, both agitators move relative to the reactor body but at different speeds.

The invention claimed is:

1. A method for mixing comprising:
   i) passing process material continuously through a tubular reactor;
   ii) rotating the tubular reactor through reciprocating arcs about a longitudinal axis of the reactor as the process material passes therethrough;
   wherein the reciprocating arcs are 360° or less;
   wherein the tubular reactor includes a backing flange at each end;
   wherein sealing flanges are bolted to the backing flanges to form a sealed system;
   wherein the tubular reactor includes a body with connections for continuous feed and discharge of the process material, whereby the body rotates through the reciprocating arcs to mix the process material;
   wherein agitators are provided within the tubular reactor to cause radial mixing of the process material; and
   wherein the process material is a fluid containing less than 50%, by volume, solids.

2. The method for mixing according to claim 1, wherein the passing of the process material continuously through the tubular reactor is plug flow.

3. The method for mixing according to claim 2, wherein the plug flow is promoted by the presence of baffles within the tubular reactor.

4. The method for mixing according to claim 1, wherein heat is added or removed from the process material as the process material flows through the tubular reactor.

5. The method for mixing according to claim 1, wherein the tubular reactor has a plug flow performance equivalent to or better than a 1 liter stirred vessel with a pitched turbine blade rotating at 400 rpm.

6. The method for mixing according to claim 1, wherein the agitators are static mixers.

7. The method for mixing according to claim 1, wherein the agitators are dynamic mixers.

8. The method for mixing according to claim 1, wherein the tubular reactor contains agitators that are static mixers and agitators that are dynamic mixers.

9. The method for mixing according to claim 1, wherein the agitators are mounted on an agitator shaft that is fixed in relation to the body of the tubular reactor.

10. The method for mixing according to claim 9, wherein the agitator shaft is free to rotate in relation to the body of the tubular reactor.

11. The method for mixing according to claim 1, wherein the tubular reactor is provided with internal baffles.

12. The method for mixing according to claim 1, wherein the tubular reactor comprises a means to add or remove heat comprising: a temperature sensor, a temperature controller, and a temperature control element.

13. The method for mixing according to claim 1, wherein the tubular reactor comprises a means to monitor the process conditions comprising: one or more analytical devices.

* * * * *